United States Patent [19]

Bräuninger

[11] Patent Number: 4,629,259

[45] Date of Patent: Dec. 16, 1986

[54] METHOD AND SYSTEM TO OBTAIN A REFERENCE SIGNAL FOR A BRAKE CONTROLLING SYSTEM

[75] Inventor: Jürgen Bräuninger, Stuttgart, Fed. Rep. of Germany

[73] Assignee: Robert Bosch GmbH, Stuttgart, Fed. Rep. of Germany

[21] Appl. No.: 780,396

[22] Filed: Sep. 26, 1985

[30] Foreign Application Priority Data

Sep. 29, 1984 [DE] Fed. Rep. of Germany ....... 3435864

[51] Int. Cl.$^4$ .............................................. B60T 8/66
[52] U.S. Cl. .................................... 303/109; 303/111; 303/96; 364/426
[58] Field of Search ................. 303/96, 109, 106, 105, 303/111, 110; 188/181 R, 181 A, 181 T; 364/426

[56] References Cited

U.S. PATENT DOCUMENTS 4,053,188 10/1977 Jonner .................................. 303/109
4,338,669 7/1982 Skarvada ............................. 303/109

Primary Examiner—Douglas C. Butler
Assistant Examiner—Alvin Oberley
Attorney, Agent, or Firm—Frishauf, Holtz, Goodman & Woodward

[57] ABSTRACT

To reduce the transmission requirement of transmitting data between brake controlled microprocessors (7, 8, 9; 20–25) and a reference microprocessor, or reference microprocessor section (15) within one of the wheel speed microprocessors, the microprocessors are connected in a ring connection, or ring bus (13; 26, 27). The microprocessors generate, in each processing cycle, a code number based on the then pertaining operating conditions of the wheel or axle with which the respective microprocessor is associated. A code number determines one of several slopes for changing the reference signal. The code numbers are applied to the ring connection and thus to the reference microprocessor, where they are compared with stored code numbers, in which the stored code numbers are arranged in a predetermined priority sequence. Dependant on this comparison, a new reference signal is then generated which is transmitted to the microprocessors over the ring connection or ring bus for use as a reference value in calculating possible positive or negative slip of an associated wheel or the wheels of an associated axle. The system is particularly simple to check since transmitted code numbers, being recirculated in the ring connection, can be compared with previously transmitted code numbers.

9 Claims, 4 Drawing Figures

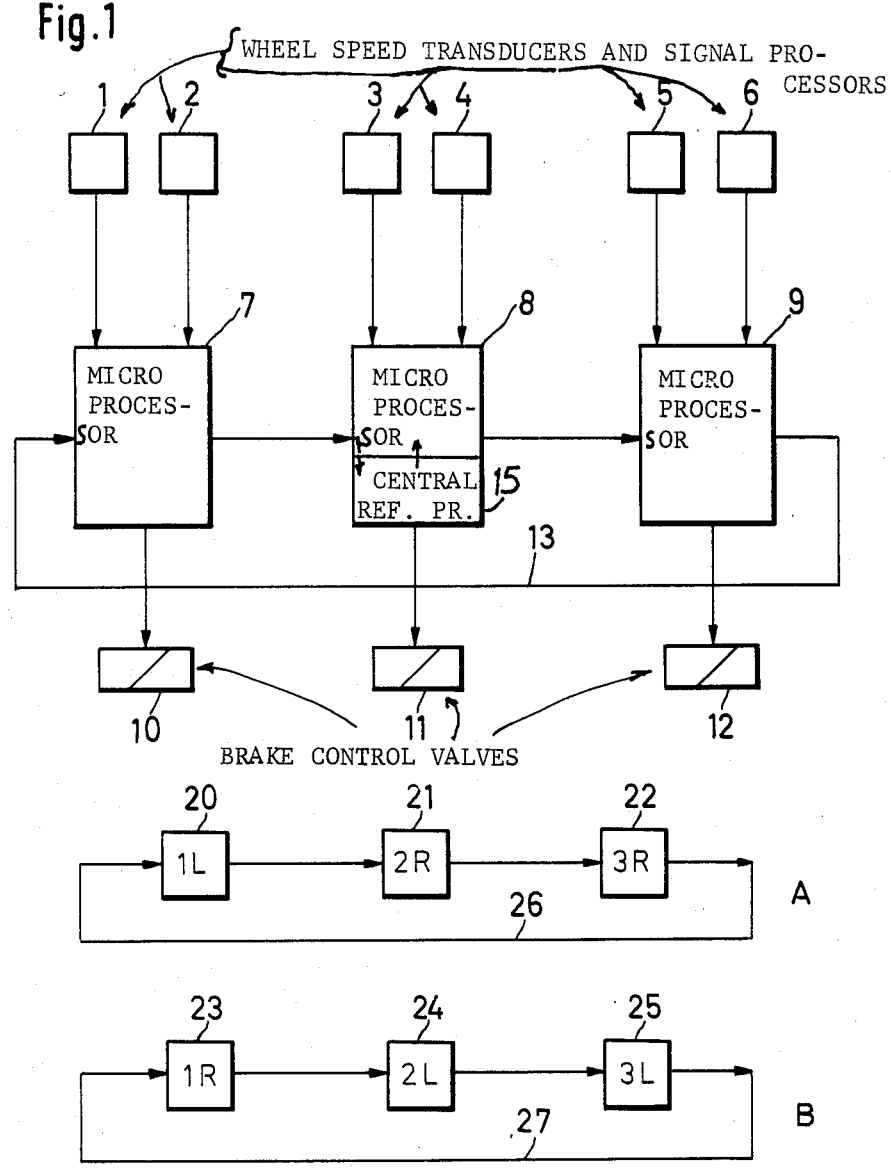

METHOD AND SYSTEM TO OBTAIN A REFERENCE SIGNAL FOR A BRAKE CONTROLLING SYSTEM

Reference to related patent, the disclosure of which is hereby incorporated by reference: U.S. Pat. No. 4,053,188, Oct. 11, 1977, JONNER.

The present invention relates to a brake controlling system for automotive vehicles and more particularly to an anti-brake lock system in which microprocessor elements are associated with respective wheels or axles, which are to be braked, and process signals, representative of wheel speed of the respective wheels or axles, to derive control signals which are used to control the braking pressure of fluid-operated brakes, for example, hydraulic, pneumatic, or vacuum brakes.

BACKGROUND

It has previously been proposed—see the referenced U.S. Pat. No. 4,053,188, JONNER, the disclosure of which is hereby incorporated by reference, to obtain a reference signal by sensing the speed of various wheels, and of first selecting the higher one of two wheel speeds and then changing the reference signal in accordance with time relationships stored, in the microprocessor. The time relationships, that is, the time constants of change, may be mathematically reprsented by curves. The curves representing the time constants may have different slopes which, then, change the reference signal in respectively different time rates. Change-over to the respective time constants is carried out, in accordance with this patent, based on wheel speed signals which are compared with the basic reference signal and with other criteria as follows:

(1) The mathematical curve will have a positive slope when a wheel speed signal is larger than the initial reference signal;

(2a) The slope will be highly negative if both wheel signals are smaller than the initial reference value; and (2b) A small negative slope will be effective if braking pressure is maintained constant or is being decreased under control of an anti-brake lock system (ABS).

Additional time constants, for differently sloped curves may also be provided, and the selection of the curve or slope may additionally be influenced by other factors.

The foregoing brief explanation shows that the positive slope has priority; it is only necessary that the speed signal from one wheel is larger than the reference signal in order to render the positive slope effective.

The system to carry out this arrangement as described in U.S. Pat. No. 4,053,188 includes a memory for storing the reference value; first and second signal inputs for receiving respective first and second input signals whose values are dependent on the respective rotational speeds of two different wheels of the vehicle; a selector circuit, connected to the first and second signal inputs, for feeding the one of the first and second input signals with the greater value to the memory to cause the memory to store the greater value; a comparison circuit, connected to the first and second inputs and to the memory, for comparing the values of the first and second signals with the value of the reference signal stored in the memory and for emitting respective output signals whenever the value of either of the first and second signals exceeds or falls below the value of the reference signal stored in the memory; third and fourth signal inputs for receiving respective signals indicating that the control members associated with the wheels from which the first and second signals are derived have responded; and a control logic circuit, which is responsive to the output signals from the comparison circuit and to signals at the third and fourth signal inputs, for controlling the memory to cause the reference value stored in the memory to be selectively varied according to either a first negative time constant for rapidly decreasing the value in the memory whereby a very rapid matching of a higher reference value to the rotational speed of the wheel will be effected, or a second negative time constant for very slowly reducing the value in said memory whereby a very slow reduction in the reference value corresponding to a decrease in the speed of the vehicle on ground having a small coefficient of friction will be effected, or a third positive time constant for relatively rapidly increasing the value in the memory whereby a relatively rapid matching of the reference value with a greater rotational speed of a wheel will be provided. The control logic circuit causes the reference value stored in the memory to be varied according to the first time constant when the comparison circuit produces output signals indicating that the value of both of the first and second signals is less than said reference value stored in the memory; the second time constant when the comparison circuit produces output signals indicating that the value of both of the first and second signal is less than the reference value and signals are present at the third and fourth signal inputs indicating that both control members have responded; and the third time constant, when the comparison circuit produces output signals indicating that the value of at least one of the first and second signals is greater than the stored reference value.

The signals derived from two wheels are utilized to form the reference value for the slip measurement of these wheels. The wheels of one axle, of one side of the car and particularly the wheels which are diagonal to one another can be selected for this purpose.

Advantageously the above-mentioned switching devices of the control logic circuit which effects the switching in of the first time constant are effective independently of whether the vehicle brakes are being activated or not. This may also apply for the switching devices which make the second time constant effective.

Preferably, in addition to the three time constants mentioned above, the control logic circuit also can provide a fourth time constant having a positive sign which permits the reference value in the memory to increase only very slowly. This fourth time constant is made effective to control the memory by the logic circuit in both wheel speed values exceed the reference value in the memory at least by a certain value $(+\lambda)$. The second and fourth time constants may be of the same magnitude and may differ only as to their sign.

Finally, according to a further feature of the invention, the control logic circuit also provides a fifth time constant which has a positive sign and whose magnitude lies between the fourth and the third time constants. This fifth time constant is made effective by the logic circuit if either of the wheel speed values is greater than the reference value in the memory and neither of the wheel speed values deviates from this reference value by more than the predetermined value $(+\lambda)$.

THE INVENTION

Briefly, in each program cycle of control micro processors—which, in themselves can be conventional and of the type usually used in ABS apparatus—a code number is proposed based on the difference of the reference signal and the wheel-speed signal and/or on control signals of wheels with which the respective microprocessors are associated. The code number, is dependant on the then pertaining operating conditions of the wheel with which the respective microprocessor is associated, and is representative of a predetermined time rate of change or slope. The code numbers from each one of the microprocessors are applied, in a ring connection to a central or reference mircroprocessor. In the central or reference microprocessor a plurality of code numbers are stroed in a predetermined priority sequence, each code number being representative of a predetermined slope, with which the reference signal is to modify. By comparison in the reference microprocessor with the code numbers transmitted by the respective individual microprocessors, in the then current program cycle, that one of the code numbers is selected which has the highest priority and a new reference signal is computed therefrom which will be representative of the proposed code number which has the highest priority. This new reference signal is transmitted over the ring bus or ring line, sequentially, to the respective wheel, or axle-associated microprocessors and is then utilized as the reference signal in the respective microprocessors to determine whether a wheel is slipping, or skidding, so that effective control action can be initiated by control of the respective brake pressure to eliminate such slippage or skidding.

In accordance with a feature of the invention, the system can be readily expanded by providing for checking of accuracy of signals being transmitted in the ring bus by comparing, in the central microprocessor, the received reference signal with that reference signal which was transmitted to the microprocessors. An identity check, thus, provides for determination of operability of the entire system. Likewise, the code numbers which are transmitted by the respective microprocessors can be checked for identity by comparing received code numbers with code numbers as transmitted previously. Then the received code number is replaced by the newly proposed code number in each microprocessor.

The system and method has the advantage that it is no longer necessary to transmit complete data word from the microprocessors associated with individual wheels or axles to the central microprocessor for centrally obtaining the reference signal. Rather, the respective microprocessors can transmit relevant information in the form of code numbers. The code numbers are in the form of short digital words transmitted to the reference processor, thus substantially increasing the speed of response of the system without requiring high quality transmission lines. The central processor thus need transmit only the reference signal to the other microprocessors, the individual microprocessors transmitting only code numbers. The system is readily adaptable to insure that transmission errors are immediately recognized and, of course, thereby also permitting rapid analysis of the operating condition of the system.

The invention can be used for generating the reference signal in case of an ABS apparatus but also for controlling the brake and/or the motor in case of spinning of the wheels because of a too high drive moment of the motor.

DRAWINGS

FIG. 1 is a highly schematic representation of a wheel anti-lock system for a three-axle vehicle utilizing three microprocessors; and FIG. 2 is a schematic diagram of the system for a three axle vehicle using six microprocessors.

DETAILED DESCRIPTION

Figure 3:
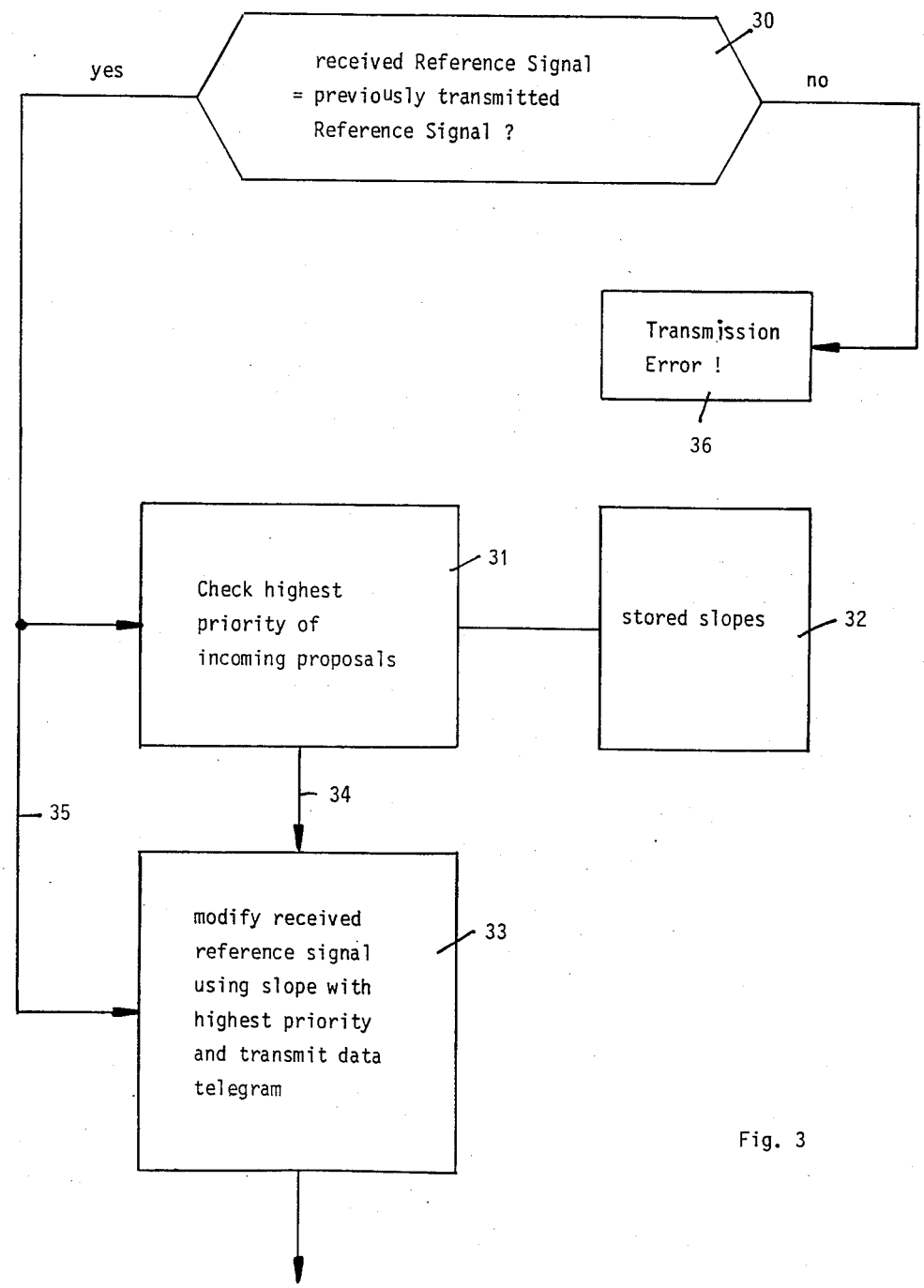
FIGS. 3 and 4 are flow diagrams concerning the reference microprocessor (FIG. 3) and one of the other microprocessors (FIG. 4).

FIG. 1 illustrates, schematically, six speed sensors and transducers 1, 2, 3, 4, 5, 6 which provide, after sensing, wave shaping—if required—and conversion into digital form, digital signals representative of speed of wheels at three respective axles of the vehicle (not shown). The digital wheel speed signals are applied to respective microprocessors 7, 8, 9, for processing the wheel speed signals and providing control signals for magnetic brake control valves 10, 11, 12. Each axle of the vehicle has one valve associated therewith. The brake control valves, as well known, can control application of pressurized brake fluid to brakes (not shown), drain pressurized brake fluid from the brake system of the respective axle, or block both inlet and drain connections to the respective axle, thus maintaining braking pressure constant. The microprocessor 7, 8, 9 determines slippage of a wheel and generate wheel acceleration and wheel deceleration signals, as well known in the ABS technology to provide respective output signals to the valves 10, 11, 12.

To determine wheel slippage, it is necessary to compare wheel speed signals with a reference signal which is at least roughly representative of vehicle speed. The reference signal can be computed in any one of the microprocessors. In the example selected, microprocessor 8 not only is associated with the operation of the wheels sensed by transducer 3, 4, but also functions as a central or reference microprocessor. In accordance with a feature of the invention, the microprocessors 7, 8, 9 are connected in a ring bus line 13. The respective valve 10, 11, 12 is controlled by slip signals and acceleration- and deceleration signals generated in the microprocessors 7, 8, 9. Each microprocessor 7, 8, 9 determines one of several possible slopes with which the reference signal should be varied according to the prevailing conditions. The slope may be positive, highly negative, or small and negative, dependant on the then pertaining wheel speeds as analyzed by the respective microprocessors 7 or 8 or 9 in comparison to the reference signal.

In accordance with a feature of the invention, the desired or appropriate slope is characterized by a code number of only a few bits. The central reference microprocessor 8, or another microprocessor or a computing portion 15 of the microprocessor 8 will store a sequence of priorities of various possible slopes.

The reference signal is generated as follows:

(1) Let it be assumed that the central reference microprocessor, or the respective section 15 thereof in reference processor 8, has calculated a new reference signal based on a reference signal in the immediately preceding programming cycle—which may be termed a basic reference signal—and the then just obtained optimal slope in the current programming cycle. This reference signal, which has just been computed, is transmitted over the ring bus 13 to the microprocessor 9 and then to microprocessor 7 and then back to the microprocessor 8. Each one of the microprocessors use this reference signal to determine slippage of the wheel, or wheels controlled by the respective valves 10, 11, 12, and hence to control braking pressure at the respective axles. By return of the reference signal to the central reference microprocessor, or the respective section 15 in microprocessor 8, and comparison of identity, the correct transmission of the reference signal can be checked.

(2) In addition to the foregoing transmission, the ring bus 13 will carry the code number derived from the two microprocessors 7 and 9, previously transmitted, and associated with the microprocessors 7 and 9. Each one of the microprocessors merely transmits and further communicates the code number which is not derived from the individual microprocessor in question. The code number which is associated with the microprocessor is compared with the previously transmitted or proposed code number for identity. The code number derived from the particular microprocessor in this code number word is then replaced by the newly proposed code number. In this manner, after passing the code number through the ring bus 13, a code number telegram will be received in the reference microprocessor, or the section thereof, which includes new proposals, of the respective microprocessors 7 and 9 for the slope.

(3) The proposals for slopes received from the microprocessors 7 and 9, and the proposal of the brake controlling portion of the microprocessor 8, are then compared with a predetermined priority sequence within the central reference microprocessor or the portion 15 thereof. The proposed slope received from the microprocessor which is assigned the highest priority determines the slope with which the previously used reference signal is changed to compute a new reference signal.

The priority is preferably so arranged that a positive slope has priority over a small negative slope; a small negative slope has priority over a high negative slope.

FIG. 2 illustrates, schematically, the microprocessors 20, 21, 22 coupled in a ring bus 26 and microprocessors 23, 24, 25 coupled in a ring bus 27. The arrangement is designed for a three-axle vehicle with six microprocessors. The processors are subdivided into two groups, A and B, containing microprocessors 20–22 and 23–26 respectively. The respective groups are interconnected by the respective ring lines. To form two reference signals, the microprocessors of the following wheels are combined into the systems as follows:

Group A:
Axle I Left Wheel
Axle II Right Wheel
Axle III Right wheel
Group B:
Axle I Right Wheel
Axle II Left Wheel
Axle III Left Wheel.

Axle I may, for example, be the front axle of the vehicle.

Each reference signal is applied to the respective microprocessors, which have been labelled 1L, 2R, 3R and 1R, 2L, 3L, respectively, to indicate the axles and left and right wheels. The reference signals generated in one of each group of microprocessors, for example 21 and 24, a part of which microprocessors forms also the central reference microprocessor, are then transmitted to the other microprocessors as described in connection with FIG. 1, and there used in determination of slip of a wheel on a road surface.

Suitable microprocessors for the microprocessors 7, 8, 9; 20–25 are:
Motorola 6801 U 4
Motorola 68HC 11
Intel 8051.

The data telegram for example on ring line 13 of FIG. 1 entering microprocessor 8 may be composed as follows:

DATA TELEGRAM

Reference Signal (e.g. 8 Bit)
Code Number A (e.g. 3 Bit) (slope proposal from $\mu$P 9)
Code Number B (e.g. 3 Bit) (slope proposal from $\mu$P 7)

FIG. 3 illustrates, in general, a flow diagram of signals in the embodiment of FIG. 1, showing how the reference values are determined, in part 15.

Block 30 examines, if received reference signal is identical with that previously transmitted. If this is the case the data telegram is transmitted to block 31, which is connected to block 32, in which the possible slopes are stored, identified by code numbers. Block 31 checks by comparing the incoming code numbers with the stored code numbers which one of the incoming code numbers has the highest priority and transmits the result to block 33 via line 34, in which block the incoming reference signal via line 35 (generated previously) is modified in dependance on the slope which corresponds to the code number coming from block 31 via line 34. The modification of the reference signal is done by increasing or decreasing the reference signal in dependance of the selected slope and the cycle rate: Thereafter the incoming reference signal is replaced by the modified reference signal and the data telegram transmitted into ring line 13.

Figure 4:
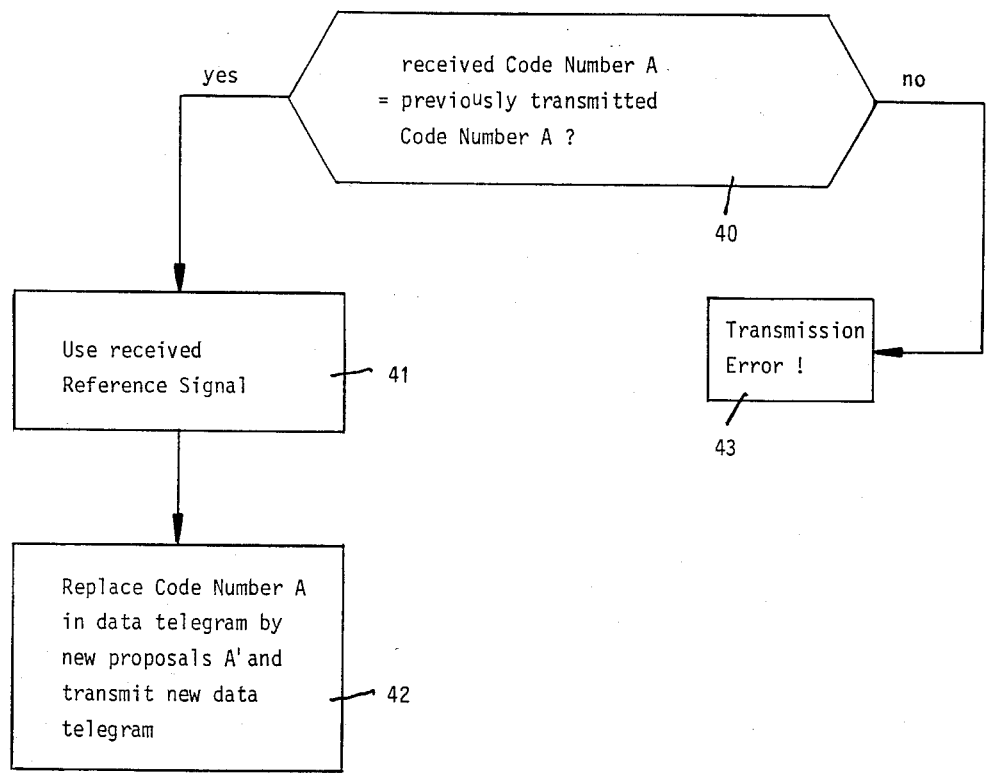

The following microprocessor 9 receives the transmitted data telegram and proves in a block 40 of FIG. 4, if previously transmitted code number A is identical with the received code number. Further, it uses incoming reference signal for slip-calculation (Block 41), replaces incoming code number A by code number A' of the new proposed slope and transmits the modified data telegram (block 42) to microprocessor 7. If the blocks 30 and 40 it is stated, that received data are different from previously transmitted data, transmission error is indicated by blocks 36 and 43.

I claim:

1. For application in a brake controlling system of a vehicle especially an anti-lock brake system having a plurality of individual microprocessors (7, 8, 9; 20–25), associated with respective wheels or axles of the vehicle, which microprocessors are connected to receive signals based on measured wheel speed signals and comparison of the wheel speed signals with a reference signal to respectively generate control signals used for brake pressure control, and reference microprocessor means (15) generating the speed reference signal;
 a method of obtaining the reference signal which is representative of vehicle speed; utilizing the steps of:
 generating at least two wheel speed signals representative of the rotary speed of corresponding wheels, or axles of the vehicle in the corresponding microprocessors;
 generating, in the reference microprocessor means, the reference signal representative of vehicle speed;

1. modifying the reference signal to derive a modified reference signal, by determining one of several slopes and changing the reference signal thereby and applying said modified reference signal to the microprocesors (7, 8, 9; 20–25) to form said microprocessor reference signal, comprising, in accordance with the invention, the steps of:

generating, in each program cycle in each microprocessor (7, 8, 9; 20–25) a code number characterising one of the several slopes in dependance of the then pertaining operating condition of the wheel, or axle, with which the respective microprocessor is associated, applying, in a ring connection (13; 26, 27) the code numbers generated by the respective individual microprocessors to the reference microprocessor means; storing, in the reference microprocessor means, a plurality of code numbers, in a predetermined priority sequence, each representative of a possible code number;

selecting in the reference microprocessor means out of the code numbers transmitted by the respective individual microprocessors, in the then current program cycle, that one of the code numbers which has the highest priority; computing a new reference signal dependant of the slope of the code number having the highest priority;

transmitting the so computed new reference signal over the ring connection to the individual microprocessors;

and utilizing, in the individual microprocessors, the so computed new reference signal as the reference signal for comparison with the individual wheel speed signals to effect control of the brake pressure of the respective wheels or axles with which the individual microprocessors are associated.

2. Method according to claim 1, wherein that one of the microprocessors forming the last microprocessor in advance of the reference microprocessor means transmits the reference signal back to the reference microprocessor means;

and further including the step of comparing the so transmitted and received reference signal with the reference signal initially transmitted by the reference microprocessor means for identity to determine proper operation.

3. Method according to claim 1, wherein the code numbers received by the reference microprocessor means and representative of the slope proposed by the respective microprocessors are transmitted, sequentially, in the form of a data sequence by the reference microprocessor means on the ring connection to the respective microprocessors (7, 8, 9; 20–25);

and including the step of comparing, within the respective microprocessors, the code number previously proposed by the respective microprocessor with the received respective code number from the referene micrprocessor means for identity, to thereby determine proper operation of the microprocessors and/or the ring connection.

4. Method according to claim 3, including the step of replacing, within the individual microprocessors (7, 8, 9; 20–25) the received code number associated with the individual microprocessor by the newly determined code number and thereby changing the data sequence;

and transmitting the so changed data sequence to the next subsequent microprocessor or, respectively, to the reference microprocessor means.

5. Method according to claim 2, wherein the code numbers received by the reference microprocessor means and representative of the slope proposed by the respective microprocessors are transmitted, sequentially, in the form of a data sequence by the reference microprocesor means on the ring connection to the respective microprocessors (7, 8, 9; 20–25);

and including the step of comparing, within the respective microprocessor, the code number previously transmitted by the respective microprocessors with the received code number from the reference microprocessor means for identity, to thereby determine proper operation of the microprocessors and/or the ring connection.

6. Method according to claim 5, including the step of replacing, within the individual microprocessors (7, 8, 9; 20–25) the received code number associated with the individual microprocessor by the newly determined code number and thereby change the data sequence;

and transmitting the so changed data sequence to the next subsequent microprocessor or, respectively, to the reference microprocessor means.

7. Brake controlling system for a vehicle having:

means (1–6) for generating at least two wheel speed signals representative of the rotary speed of at least two wheels, or axle of the vehicle;

a plurality of individual microprocessors (7, 8, 9; 20–25) coupled to receive respective wheel speed signals, and associated with respective wheels or axles of the vehicle, which microprocessors are further connected to receive a reference signal and comparison of the wheel speed signals with the reference signal to respectively generate brake control signals, reference microprocessor means (15) generating a speed reference signal, the reference microprocessor means (15) generating the reference signal representative of vehicle speed, by modifying the reference signal determined previously by one of several slopes and applying a modified reference signals to the microprocessors (7, 8, 9; 20–25) to form said microprocessor brake control signals, wherein, in accordance with the invention each microprocessor (7, 8, 9; 20–25) in each program cycle generates a code number characterising one of several slopes in dependance of the then pertaining operating condition of the wheel, or axle with which the respective microprocessor is associated, a ring connection (13; 26, 27) is provided, communicating the code numbers generated by the respective individual microprocessors to the reference microprocessor means, the reference microprocessor means (15) including a storage means for storing a plurality of slopes in a predetermined priority sequence, each representative of a possible code number, the reference microprocessor means selecting, by comparison with the code numbers transmitted by the respective individual microprocessors in the then current program cycle, that one of the code numbers which has the highest priority;

said reference microprocessor means further comprising a new reference signal representative of the code number having the highest priority and transmitting the so computed new reference signal over the ring connection to the individual microprocessors;

said individual microprocessors being coupled to the ring connection and interconnected thereby in a closed ring, together with the reference microprocessor means, the ring connection transmitting the so computed new reference signal as the reference signal for comparison with the individual wheel speed signals to effect control of the brake pressure of the respective wheels or axles with which the individual microprocessors are associated.

8. Brake controlling system according to claim 7, wherein that one (7) of the micrprocessors (7-9) forming the last microprocessor in advance of the reference microprocessor means (15) transmits the reference signal back to the reference microprocessor means;

and the reference microprocessor means compares the so received reference signal with the reference signal initially transmitted by reference microprocessor means for identity to determine proper operation.

9. Anti-lock brake system according to claim 7, wherein the respective microprocessors (7-9) transmitting the code number representative of the proposed slope, transmit code numbers in the form of a data sequence, said code numbers being received, within the ring connection, by the respective microprocessors;

and wherein the respective microprocessors compare the code numbers previously transmitted by the respective microprocessors, with the received code numbers from the reference microprocessor means (15) for identity, to thereby determine proper operation of the microprocessors and/or of the ring connection.

* * * * *